United States Patent [19]

Giallorenzi

[11] Patent Number: 4,648,083
[45] Date of Patent: Mar. 3, 1987

[54] ALL-OPTICAL TOWED AND CONFORMAL ARRAYS

[75] Inventor: Thomas G. Giallorenzi, Springfield, Va.

[73] Assignee: The United States of America as represented by the Secretary of the Navy, Washington, D.C.

[21] Appl. No.: 716,569

[22] Filed: Jan. 3, 1985

[51] Int. Cl.⁴ .................... H04B 9/00; H04R 23/00
[52] U.S. Cl. .................... 367/149; 367/130; 367/154; 370/3; 455/611
[58] Field of Search .................. 367/20, 21, 80, 130, 367/149, 154; 370/1, 2, 3, 4; 455/611

[56] References Cited

U.S. PATENT DOCUMENTS

| | | | |
|---|---|---|---|
| 3,676,684 | 7/1972 | De Lange | 370/3 |
| 3,953,727 | 4/1976 | D'Auria et al. | |
| 4,115,753 | 9/1978 | Shajenko | 367/130 |
| 4,525,818 | 6/1985 | Cielo et al. | 367/149 |

*Primary Examiner*—Richard A. Farley
*Attorney, Agent, or Firm*—Sol Sheinbein; Stephen G. Mican

[57] ABSTRACT

A method and apparatus for remotely activating and analyzing fiber optic towed and conformal sensor arrays using fiber optic transmission and reception with multiplexed input and output signals using optical wavelength division, electronic frequency division, or both.

33 Claims, 6 Drawing Figures

FIBER OPTIC THIN LINE ARRAY

ALL-OPTICAL FIBER OPTIC THIN LINE ARRAY

ALL-OPTICAL TOWED AND CONFORMAL ARRAYS

BACKGROUND OF THE INVENTION

The present invention relates to fiber optic sensor arrays, and particularly to methods and apparatus for implementing an all-optical remote fiber optic sensor array.

Fiber optic sensor arrays are generally arranged in linear or planar configurations. As applied to undersea applications they are either fastened to a hull or pulled under water by tow cables extending to a tow platform. In either case, they are commonly used to sense acoustic data, array depth, array heading and water temperature.

Presently used fiber optic array elements generally have fiber optic sensors, electro-optical interfaces to power the sensors and to convert their optical signals to electrical output signals, and a telemetry unit, to format and transmit the electrical output signals to a remote receiving station. Because sensor arrays may contain thousands of fiber optic sensors, thousands of electro-optical interfaces along with a complex telemetry system and associated wiring connections are involved. Such fiber optic sensor arrays are correspondingly costly, complex and unreliable.

OBJECTS OF THE INVENTION

Accordingly, one object of the invention is to eliminate complex telemetry systems in a towed fiber optic sensor array.

Another object of the present invention is to eliminate electrical components and wiring connections in a towed fiber optic sensor array to improve array reliability.

Yet another object is to eliminate electro-optical interfaces in a towed fiber optic sensor array.

A further object is to remotely power the sensors in a towed fiber optic sensor array.

A still further object is to remotely process optical output signals from sensors in a towed fiber optic sensor array to facilitate the handling of data from large numbers of array sensing elements.

SUMMARY OF THE INVENTION

The present invention eliminates all electronic components and wiring in a remote linear or planar fiber optic sensor array by activating interferometer-type fiber optic sensors used for sensing such parameters as acoustics, depth and heading with remotely located lasers. Optic fibers may be used to couple the fiber optic sensors to laser sources as well as transmit the modulated sensor outputs to optical detectors in a remote optical transmitter/receiver installation. Each of the remotely located lasers used for activating the fiber optic sensors may have its own distinct wavelength, modulation signal, or combination thereof, so that multiplex operation on the optic fibers is possible, thereby greatly increasing the number of sensors that may be used for a given number of optic fibers.

For example, using a sensor array with $N^2$ sensors according to the present invention with multiplex operation, a total of N laser sources having their outputs transmitted down to a towed array on N optical fibers within the tow cable when used with N return optic fibers within the tow cable may be used to remotely activate and sense a total of $N^2$ single output elements in a towed fiber optic sensor array. Differential output sensor elements used in the fiber optic array require a total of 2N return optic fibers.

DESCRIPTION OF THE PREFERRED EMBODIMENTS

The present invention uses a laser controlled optical transmission and detection system which replaces all the electrical components and wiring as found on remote electrooptical fiber optic sensor arrays in present use. The laser or lasers which power the sensors as well as the sensor signal detection hardware are located safely aboard the tow platform or vessel so that no delicate or expensive hardware need be located in the remote array.

Figure 1:
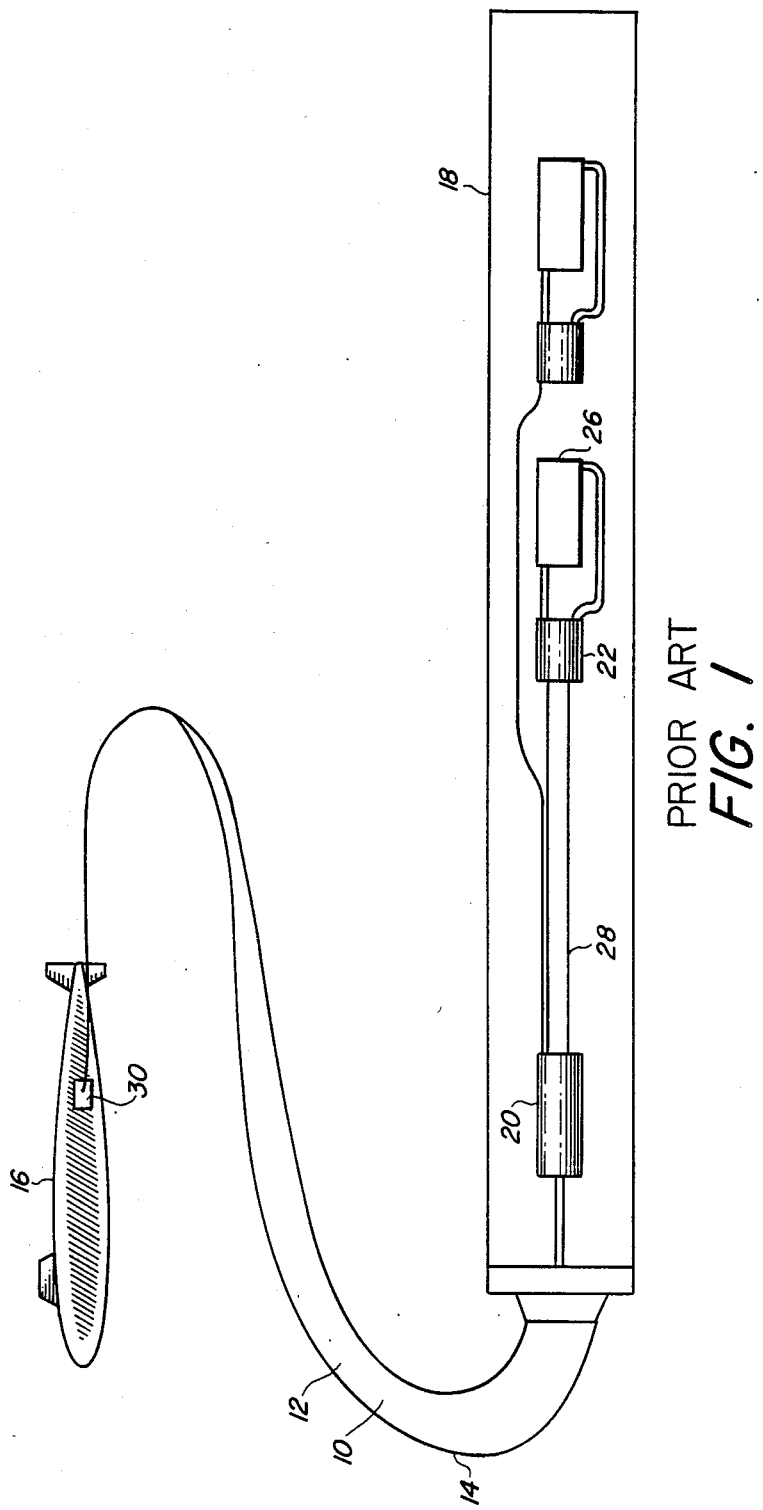
FIG. 1 is an illustration of a towed fiber optic thin line array (TLA) according to the prior art in a typical installation with a conventional electronic telemetry system.

Referring to the drawings, wherein reference characters designate like or corresponding parts throughout the views, FIG. 1 illustrates a towed fiber optic array according to the prior art. Electrical power lines 10 and telemetry lines 12 are encased in a tow cable 14 extending from a tow platform 16 to a towed fiber optic array 18. Within array 18 power lines 10 and telemetry lines 12 connect to a common electronic power and telemetry can 20. Power and telemetry can 20 has outputs for powering electro-optical cans 22. Each electro-optical can 22 furnishes a source of light to activate a corresponding fiber optic sensor 26. The output of each sensor 26 is returned to its corresponding electrooptical can 22 and is converted to an electrical output signal. Each electrical output signal from each electrooptical can 22 is fed to corresponding inputs on the power and telemetry can 20 via signal lines 28. The outputs from the sensors 26 are processed in the power and telemetry can 20 to generate a serial telemetry signal which is fed to a telemetry receiver 30 on board the tow platform 16 via the telemetry lines 12 within the cable 14. Electrical power for the power and telemetry can 20 is supplied by a power supply 31 on board the tow platform 16 via the power line 10.

Figure 2:
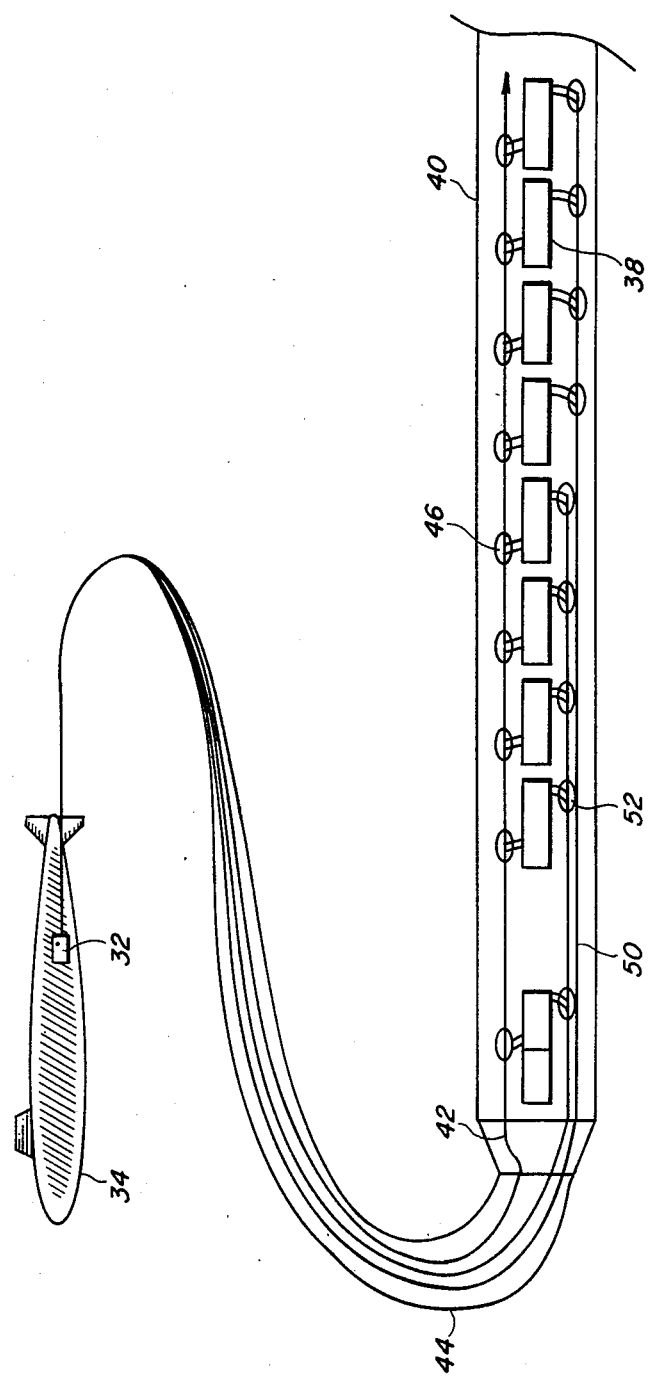
FIG. 2 is an illustration of a towed TLA sensor array according to the present invention in a typical installation with an optical tow cable and a remote optial transmitter/receiver.
Figure 3:
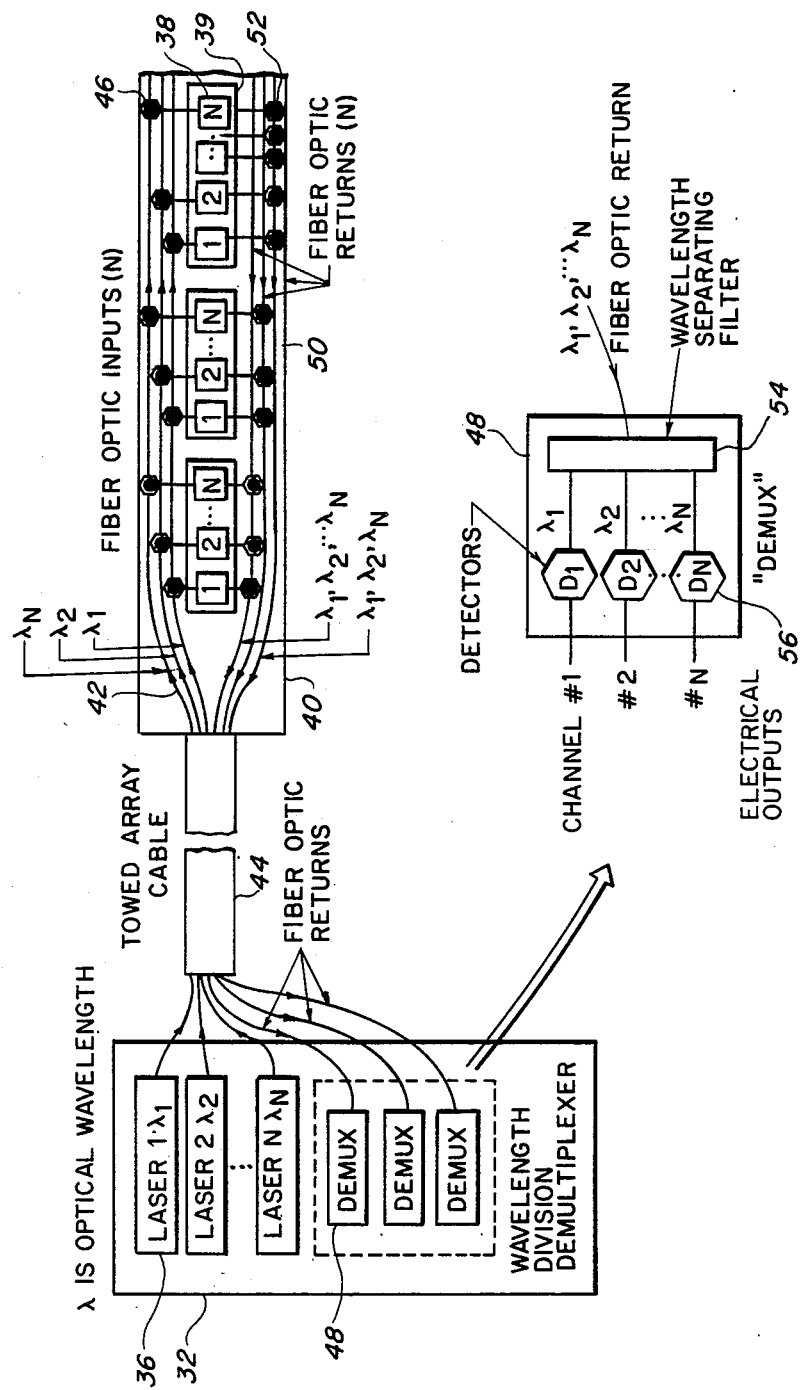
FIG. 3 is a schematic representation of a towed fiber optic TLA system according to the present invention with optical wavelength multiplexed inputs and outputs.

FIG. 2 illustrates a typical installation of a towed fiber optic array according to the present invention and FIG. 3 illustrates one embodiment of the invention using multiple wavelength lasers for sensor activation and optical wavelength filter demultiplexing for sensor detection. Referring to FIG. 3, an optical sensor array transmitter/receiver 32 mounted in a tow platform 34 as shown in FIG. 2 includes a quantity of N laser sources 36, each laser source having its own distinct wavelength $\lambda_i$, where i ranges from 1 to N. Each laser source 36 is connected to N different fiber optic sensors 38 mounted in a towed fiber optic array 40 via a fiber optic input line 42 which passes through a tow cable 44 and couples to each sensor 38 by a fiber optic input coupler 46. The $N^2$ sensors 38 are arranged into N sensor groups 39 so that each laser source 36 connects to one, and only one, sensor 38 in each sensor group 39. Consequently, as illustrated in FIG. 3, a total of N laser sources 36 feed a total of $N^2$ sensors 38, one sensor 38 in each of N sensor groups 39 through N input lines 42 with $N^2$ input couplers 46.

If a single ended sensor output system is used, the outputs of all the N sensors 38 in each sensor group 39 are fed together into one of N optical wavelength demultiplexers 48 contained in the transmitter/receiver 32 via a common fiber optic output line 50 passing through the tow cable 44 and coupled to each sensor 38 output by N fiber optic output couplers 52. Accordingly, each of the N output lines 50 are connected to one of the N sensor groups 39 of N sensors 38 through N output couplers 52 so that a total of $N^2$ sensors 38 feed into N demultiplexers 48. Each demultiplexer 48 includes a wavelength separator 54 having N outputs, with each output corresponding to a different laser source 36 wavelength $\lambda_i$, where i ranges from 1 to N, and N electrical output optical detectors 56, one detector 56 connected to each separator 54 output. As a result, each demultiplexer 48 has N electrical outputs, each output corresponding to one of the N sensor 38 outputs feeding into it so that every one of the N outputs of every one of the N demultiplexers 48 correspond to a different one of the $N^2$ sensor 38 outputs.

If a differential output system is desired, each sensor 38 will have two outputs to establish a differential signal. In this case, following the configuration outlined above, but expanding the number of output components accordingly, all sensor 38 output pairs in each sensor group 39 are split to feed into two separate demultiplers 48 through two fiber optic output lines 50 with 2N fiber optic output couplers 52 so that each one of the pair of outputs from each sensor 38 in each sensor group 39 feeds a different one of the two corresponding demultiplers 48. Accordingly, the $N^2$ sensors 38 have their $N^2$ differential outputs feeding 2N demultiplexers 48 through $2N^2$ output couplers 52 and 2N output lines 50. Consequently, one pair of the 2N demultiplexer 48 outputs corresponds to each sensor 38 differential output signal.

In accordance with the embodiment of the invention described above, a bank of N laser sources 36 with N different wavelengths $\lambda_i$, where i ranges from 1 to N, may be used to remotely power $N^2$ fiber optic sensors 38 through N fiber optic input lines 42, and the sensors 38 may have their outputs remotely detected by N demultiplexers 48 through N fiber optic output liner 50 for single ended outputs, or 2N demultiplexers 48 through 2N fiber optic output lines 50 for differential outputs.

The methodology of remote activation and analysis of fiber optic sensor arrays with optical wavelength demultiplexing, as illustrated in FIG. 3, is as follows: Each one of the laser sources 36 included in the optical transmitter/receiver 32 has a different and distinct wavelength from all the others. The laser sources 36 each activate an equal number of different fiber optic sensors 38 within the fiber optic array 40 via one fiber optic input line 42 within the tow cable 44 per laser source 36 and one fiber optic input coupler 46 per sensor 38. The outputs of the sensors 38 are multiplexed by combining them into equal numbers of the sensor groups 39 with one common fiber optic output line 50 within the tow cable 44 and one fiber optic output coupler 52 per sensor 38, such that one, and only one, sensor 38 in each sensor group 39 is activated by each of the laser, sources 36. The outputs of the sensors 36 are demultiplexed by feeding the sensor 38 output signals on each fiber optic output line 50 to its own optical wavelength demultiplexer 48. Each demultiplexer 48 separates the sensor 38 output signals for its corresponding sensor group 39 with the optical wavelength separator 54 included in each demultiplexer 48. The optical wavelength separator 54 has one different and distinct wavelength output for every laser source 36 wavelength activating the sensors 38 so that each sensor 38 output signal is channelled to a different separator 54 output. Each separator 54 output is then converted to a corresponding electrical signal output with the electric output optical detectors 56 included in each demultiplexer 48. Consequently, each detector 56 in each demultiplexer 48 has an electrical output signal corresponding to a different one of the sensor 38 outputs of the sensor group 39 that each demultiplexer 48 processes.

The sensors 38 to be used in the embodiment described above may take the form of a Mach-Zehnder interferometer fabricated with a small path length difference $\Delta l$ between the signal and reference arms. If the laser sources 36 each have a frequency sweep through a certain frequency range $\Delta\omega$, the path length difference $\Delta l$ and frequency sweep $\Delta\omega$ induce a phase shift sweep $\Delta\phi = 2\pi\Delta l\Delta\omega$ which produces a heterodyne type output signal which is demodulated at the receiver 32. The operation of this type of detection scheme is detailed in "Homodyne Demodulation Scheme for Fiber Optic Sensors Using Phase Generated Carrier," A. Dandridge et al., IEEE trasactions on Microwave Theory and Techniques, Volume MTT-30, No. 10, October 1982, pages 1635 through 1641, herein incorporated by reference. The embodiments of the invention described below may also use such sensors and detection scheme, and the modulation frequencies $S_i$ described below then correspond to the rate of laser frequency sweep $\Delta\omega$.

Figure 4:
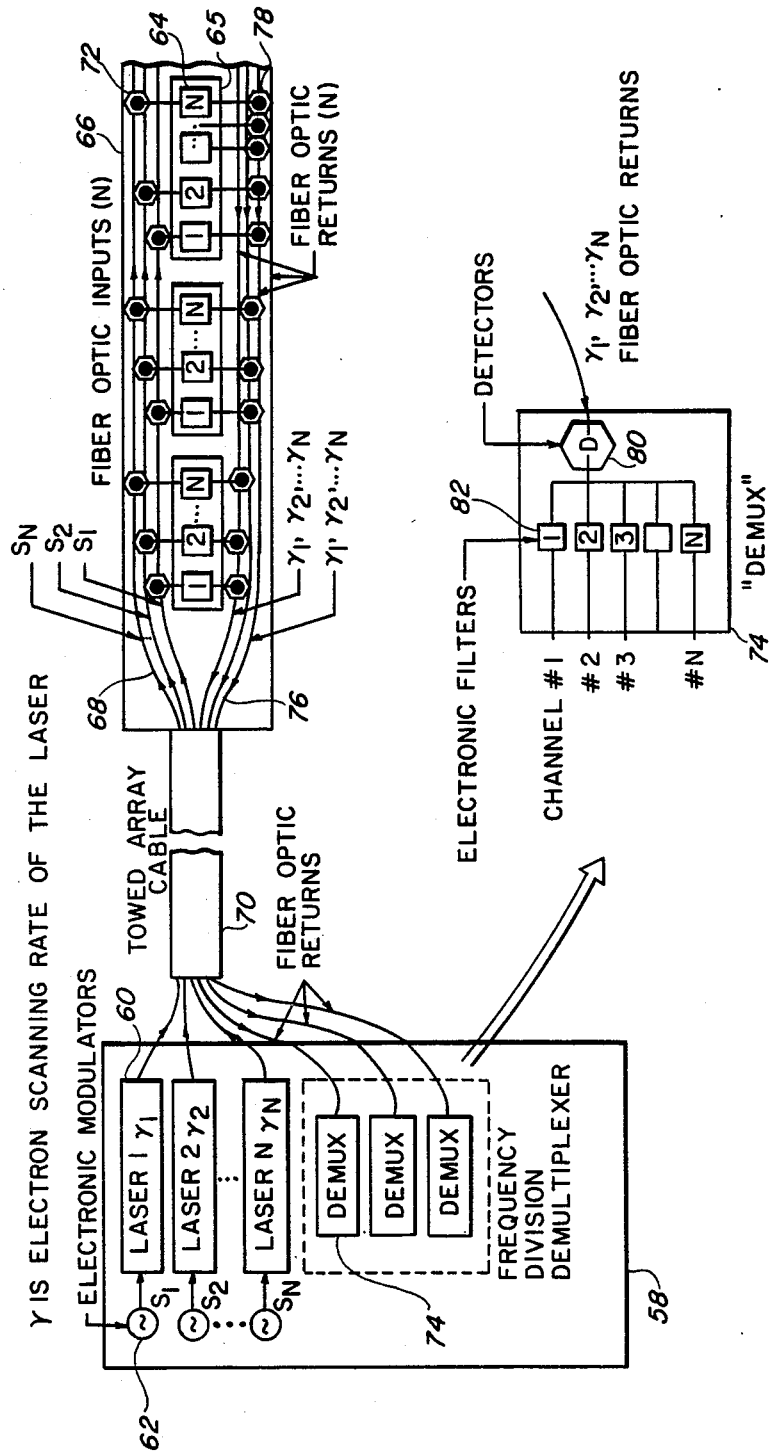
FIG. 4 is a schematic representation of a fiber optic TLA system according to the present invention with modulated signal multiplexed inputs and outputs.

Another embodiment of the invention is illustrated in FIG. 4 using signal frequency modulated lasers for sensor activation and modulated signal filter multiplexing for sensor detection. An optical sensor array transmitter/receiver 58 includes a quantity of N laser sources 60 and N electronic modulators 62, each laser source 60 modulated by a corresponding electronic modulator 62. Each modulator 62 has a different modulation signal $S_i$, where i ranges from 1 to N, with its own distinct and different periodic variation in amplitude which modulates its corresponding laser source 60 in frequency proportioned to the rate of change in modulation signal $S_i$ amplitude. Modulation signals $S_i$ may assume various periodic waveforms, but sawtooth waveforms are preferred, since they cause linear periodic frequency shifts in frequency for their respective laser sources 60. Each laser source 60 is connected to N different fiber optic sensors 64 mounted in a towed fiber optic array 66 via a fiber optic input line 68 which passes through a tow-cable 70 and couples to each sensor 64 by a fiber optic input coupler 72. The $N^2$ sensors 64 are arranged into N sensor groups 65 so that each laser source 36 connects to one, and only one, sensor 64 in each sensor group 65. Accordingly, a total of N electronic modulators modulate N laser sources 60 with N different modulating signals $S_i$, where i ranges from 1 to N, and the N laser sources 60 each feed $N^2$ sensors 64, one sensor 64 in each of N sensor groups 65, through N input laser 68 and $N^2$ input couplers 72. Each sensor 64 connected to each laser source 60 has the same output signal frequency $\gamma_i$, where i ranges from 1 to N, which is proportional to the rate of change in amplitude of the laser source 60 modulation signal $S^i$. If a single ended sensor output system is used, the outputs of all the N sensors 64 in each sensor group 65 are fed together into one of N optical modulation signal frequency demultiplexers 74 contained in the transmitter/receiver 58 via one of N common fiber optic output lines 76 passing through the tow cable 70 and coupled to each sensor 64 output by one of N fiber optic output couplers 78. As a result, each of the N output lines 76 are connected to one of the sensor groups 65 of N sensors 64 through N output couplers 78 so that a total of $N^2$ sensors 64 feed into N demultiplexers 74. Each demultiplexer 74 includes an electrical output optical detector 80 feeding N frequency selective filters 82, each filter 82 having an output tuned to a different one of the sensor 64 output signal frequencies $\gamma_1$, where i ranges from 1 to N. Consequently, each demultiplexer 74 has N electrical outputs, each output corresponding to one of the N sensor 64 outputs of the sensor group 65 feeding into it, so that every one of the N outputs of every one of the N demultiplexers 74 corresponds to a different one the $N^2$ sensor 64 outputs.

If a differential output system is desired, each sensor 64 will have two outputs to establish differential signal. In this case, following the configuration for the single ended output system outlined above, but expanding the number of output components accordingly, all sensor 64 differential output pairs in each sensor group 65 are split to feed into two separate demultiplexers 74 through two fiber optic output lines 76 with 2N fiber optic output couplers 78 so that each one of the pair of outputs from each sensor 64 in each sensor group 65 feeds a different one of the two corresponding demultiplexers 74. Accordingly, the $N^2$ sensors 64 have their N differential outputs feeding 2N demultiplexers 74 through $2N^2$ output couplers 78 and 2N output lines 76.

The methodology of remote activation and analysis of fiber optic sensor arrays with optical modulated signal frequency demultiplexing, as illustrated in FIG. 4, is as follows: Each one of the electronic modulators 62 included in the optical transmitter/receiver 58 impresses a modulation signal on a different one of the laser sources 60 also included in the optical transmitter/receiver 58. Each modulator 62 has a different modulation signal with its own distinct and different periodic variation in amplitude which modulates its corresponding laser source 60 in frequency proportional to the rate of change in modulation signal amplitude. The laser sources 60 each activate an equal number of different fiber optic sensors 64 within the fiber optic array 66 via one fiber optic input line 68 within the tow cable 70 per laser source 60 and one fiber optic input coupler 66 per sensor 64. Each laser source 60 activates its corresponding sensors 64 to generate output signals having a frequency proportional to the rate of amplitude change in the laser source 60 modulating signal. The outputs of the sensors 64 are multiplexed by combining them into equal numbers of the sensor groups 65 with one common fiber optic output line 76 within the tow cable 70 fiber optic output coupler 78 per sensor 64 such that one, and only one, sensor 64 in each sensor group 65 is activated by each of the laser sources 60. The output of the sensors 64 are demultiplexed by feeding the sensor 64 output signals of each sensor group 65 as each fiber optic output line 76 to its own optical modulation signal frequency demultiplexer 74. Each demultiplexer 74 converts the sensor 64 output signals for its corresponding sensor group 65 into corresponding electric output signals with the electrical output optical detector 80 included in each demultiplexer 74. The electrical output signals are divided into individual electric output signals, each one corresponding to a different one of the sensor 64 output signals in each sensor group 65 by the frequency selective filters 82 included in each demultiplexer 74, one filter 82 provided and tuned for each one of the sensor 64 output signal frequencies. Consequently, each filter 82 in each demultiplexer 74 has an electrical output signal corresponding to a different one of the sensor 64 outputs of the sensor group 65 that each demultiplexer 48 processes.

Figure 5:
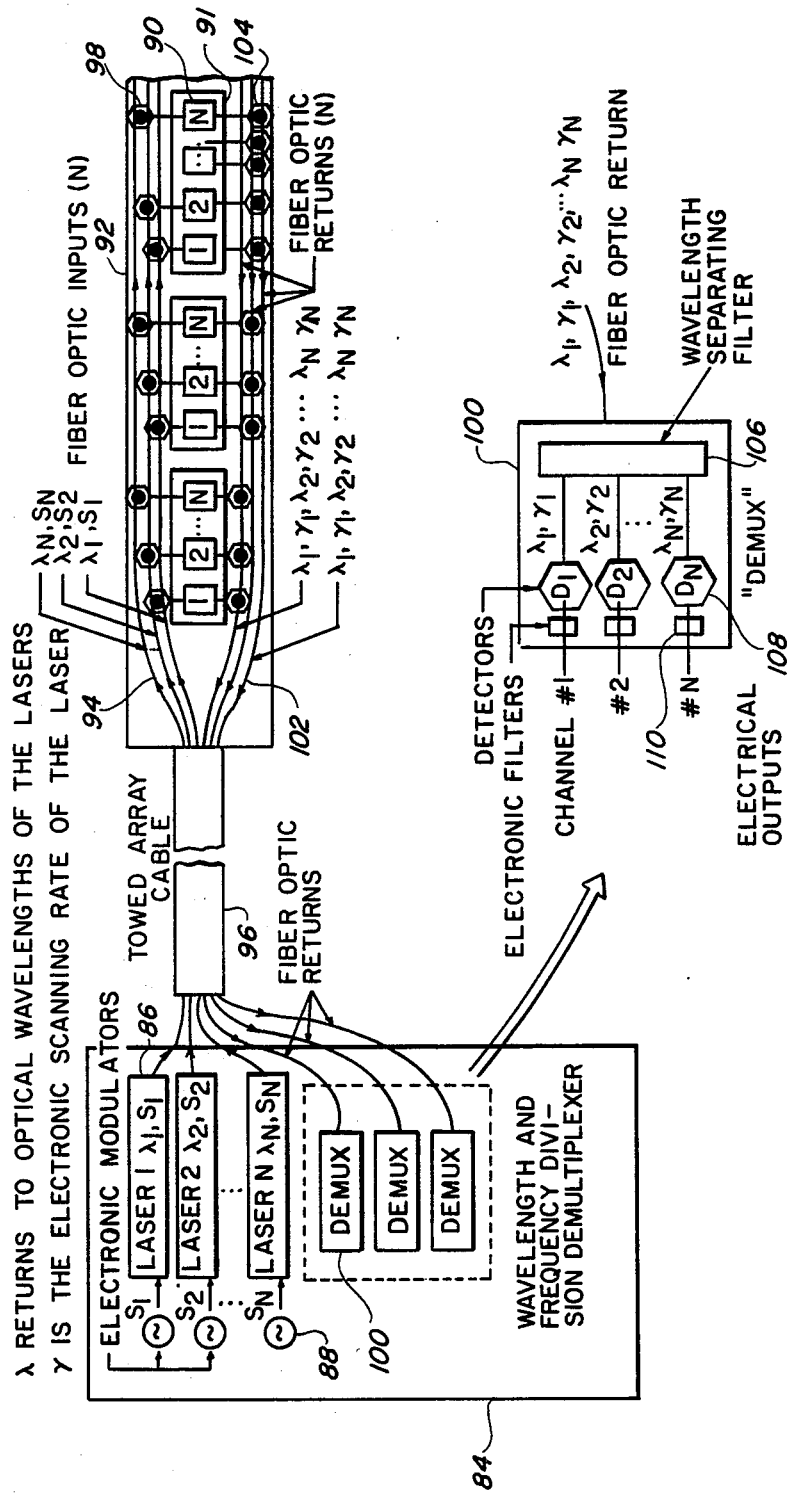
FIG. 5 is a schematic representation of a towed fiber optic TLA sensing system according to the present invention with both optical wavelength and modulated signal multiplexed inputs and outputs.

Yet another embodiment of the invention is illustrated in FIG. 5 and comprises the combination of both the optical wavelength and modulated signal frequency filter multiplexing systems of the embodiments described above. This configuration is used when channel crosstalk using either of the above described embodiments is unacceptably high. The double multiplex processing improves channel separation when additional system complexity is warranted. An optical sensor array transmitter/receiver 84 includes a quantity of N laser sources 86 and N electronic modulators 88, each laser source 86 having its own distinct wavelength $\lambda_i$ and modulated by a corresponding modulator 88 with its own different modulation signal $S_i$, where i ranges from 1 to N. Therefore, each laser source 86 has an output with its own distinct wavelength and modulation signal. Each modulation signal $S_i$ for each modulator 88 has its own distinct and different periodic variation in amplitude which modulates its corresponding laser source 86 in frequency proportional to the rae of change in modulation signal $S_i$ amplitude. Modulation signals $S_i$ may assume various periodic waveforms, but sawtooth waveforms are preferred, since they cause linear periodic shifts in frequency for their respective laser sources 86. Each laser source 86 is connected to N different fiber optic sensors 90 mounted in a towed fiber optic array 92 via a fiber optic input line 94 which passes through a tow cable 96 and couples to each sensor 90 by a fiber optic input coupler 98. The $N^2$ sensors 90 are arranged into N sensor groups 91 so that each laser source 86 connects to one, and only one, sensor 90 in each sensor group 91. As a result, a total of N electronic modulators 88 modulate N laser sources 86, each laser source having its own distinct wavelength $\lambda_i$ and modulation signal $S_i$, where i ranges from 1 to N, and the N laser sources 86 each activate one fiber optic sensor 90 in each of N sensor groups 91 through N input cables 94 and $N_2$ input couplers 98. Each sensor 90 connected to each laser source 86 has the same output signal frequency $\gamma_i$, where i ranges from 1 to N, which is proportional to the rate of change in amplitude of the laser source 86 modulation signal $S_i$.

If a single ended sensor output system is used, the outputs of all the N sensors 90 in each sensor group 91 are fed together into one of N optical wavelength and modulation signal frequency demultiplexers 100 contained in the transmitter/receiver 84 via one of N common fiber optic output lines 102 passing through the tow cable 96 and coupled to each sensor 90 by one of $N^2$ fiber optic output couplers 128. Consequently, each of the N output cables 126 are connected to one of the N sensor groups 91 of N sensors 90 through N output couplers 104 so that a total of $N^2$ sensors 90 feed into N demultiplexers 100. Each demultiplexer 100 includes an optical wavelength separator 106 with N outputs, each output having its own distinct bandpass at a wavelength $\lambda_i$ corresponding to one of the laser source 86 wavelengths $\lambda_i$, where i ranges from 1 to N. Each demultiplexer 100 also includes one of N electrical output optical detectors 108 and one of N electrical frequency selective filters 110 serially connected to each wavelength separator 106 output, each frequency selective filter 110 tuned to a different one of the output signal frequencies $\gamma_i$, where i ranges from 1 to N. Accordingly, each demultiplexer 100 has N electrical outputs, each output corresponding to one of the N sensor 90 outputs feeding into it, so that every one of the N outputs of every one of the N demultiplexers 100 corresponds to a different one of the $N^2$ sensor 90 outputs.

If a differential sensor output system is desired, each sensor 90 will have two outputs to establish a differential signal. In this case, following the configuration for the single ended output system outlined above, but expanding the number of output components accordingly, all sensor 90 differential output pairs in each sensor group 91 are split to feed into two separate demultiplexers 100 through two fiber optic output lines 102 with 2N fiber optic output couplers 104 so that each one of the pair of outputs from each sensor 90 in each sensor group 91 feeds a different one of the two corresponding demultiplexers 74. Accordingly, the $N^2$ sensors 90 have their N differential outputs feeding 2N demultiplexers 100 through $2N^2$ output couplers 104 and 2N output lines 102.

The methodology of remote activation and analysis of fiber optic sensor arrays with both optical wavelength and modulated signal frequency demultiplexing, as illustrated in FIG. 5, is as follows: Each one of the electronic modulators 88 included in the optical transmitter/receiver 84 impresses a modulation signal on a different one of the laser sources 86 also included in the optical transmitter/receiver 84. Each modulator 88 has a different modulation signal with its own distinct and different periodic variation in amplitude which modulates its corresponding laser source 86 in frequency proportional to the rate of change in modulation signal amplitude. Each one of the laser sources 86 has a different and distinct wavelength from all the others. The laser sources 86 each activate an equal number of different fiber optic sensors 90 within the fiber optic array 92 via one fiber optic input line 92 within the tow cable 96 per laser source 86 and one fiber optic input coupler 98 per sensor 90. Each laser source 86 activates its corresponding sensors 90 to generate output signals having a frequency proportional to the rate of amplitude change in the laser source 86 modulating signal. The outputs of the sensors 90 are multiplexed by combining them into equal numbers of the sensor groups 91 with one common fiber optic output line 102 within the tow cable 96 and one fiber optic output coupler 104 per sensor 90, such that one, and only one, sensor 90 in each sensor group 91 is activated by each of the laser sources 86. The outputs of the sensors 90 are demultiplexed by feeding the sensor 90 output signals on each fiber optic output line 102 to its own optical wavelength and modulators signal frequency demultiplexer 100. Each demultiplexer 100 separates the sensor 90 output signals for its corresponding sensor group 91 with the optical wavelength separator 106 included in each demultiplexer 100. The optical wavelength separator 106 has one different and distinct wavelength output for every laser source 86 wavelength activating the sensor 90 so that each sensor 90 output signal is channelled to a different separator 102 output. Each separator 106 output is then converted to a corresponding electrical signal output with the electrical output optical detectors 108 included in each demultiplexer 100, so that each detector 108 has an electrical output for a different sensor 90 in the sensor group 91 associated with each demultiplexer 100. The sensor 90 electrical outputs are filtered by passing them through the frequency selective filters 110 included in each demultiplexer 100, each filter 110 passing only the output signal frequency associated with the sensor 90 whose electrical output is filtered.

Consequently, each filter 110 in each demultiplexer 100 has a filtered electrical output signal corresponding to a different one of the sensor 90 outputs of the sensor group 91 that each demultiplexer 100 processes.

Figure 6:
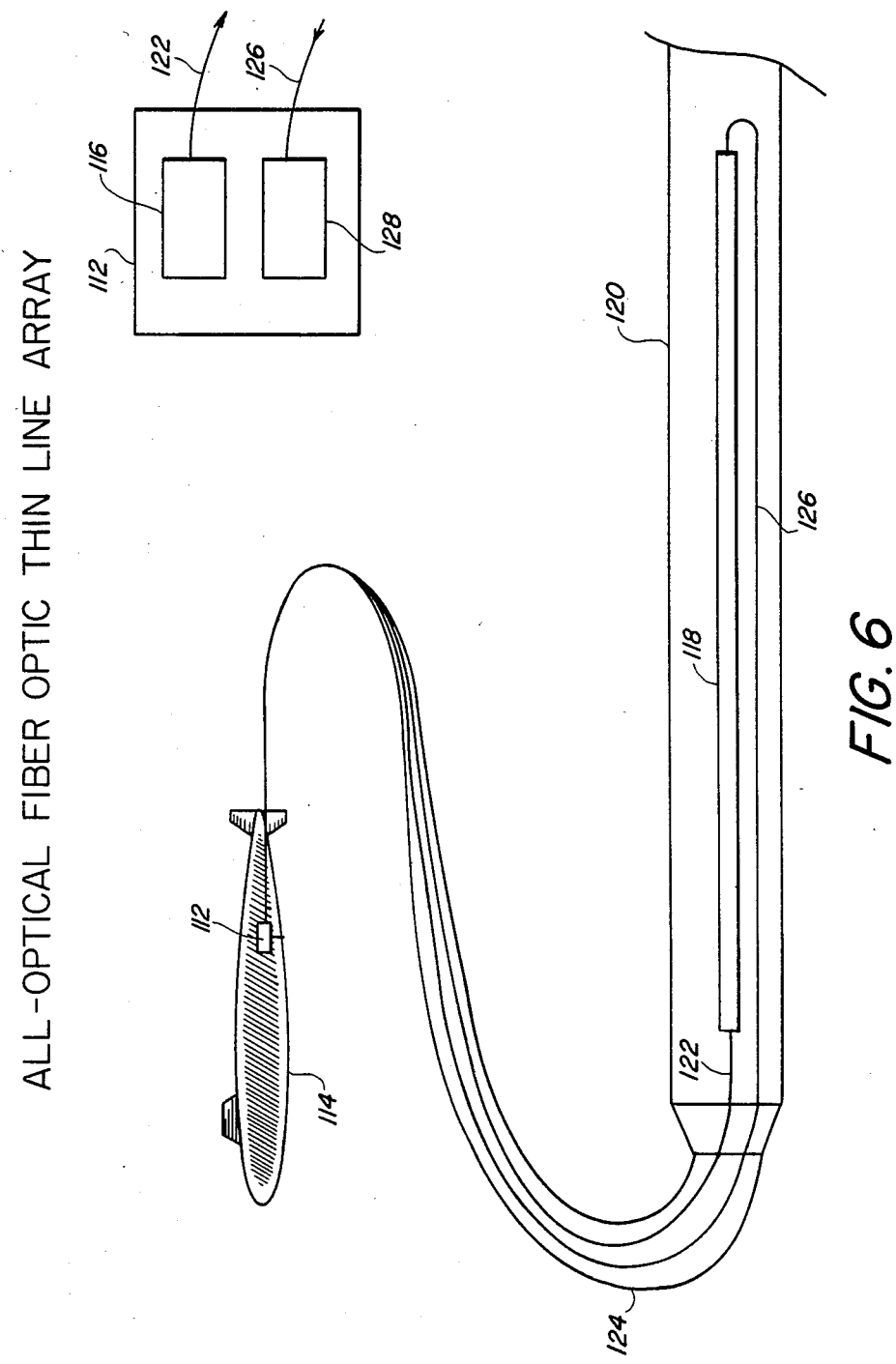
FIG. 6 is a schematic representation of a towed elongated fiber optic sensor according to the present invention for measuring the properties of acoustic waves impinging upon the sensor.

Still another embodiment of the invention is illustrated in FIG. 6. An optical fiber optic sensor transmitter/receiver 112 mounted in a tow platform 114 includes a pulsed laser source 116. The laser source 116 is connected to an elongated fiber optic acoustic wave sensor 118 mounted in a towed fiber optic sensor housing 120 via a fiber optic input line 122 which passes through a tow cable 124 and couples to the sensor 118. The sensor 118 should be at least several acoustic wavelengths in length so that interaction of incident acoustic waves affects a Bragg scattering response in the sensor 118. The output of the sensor 118 is fed into the optical transmitter/receiver 112 via fiber optic output line 126 passing through the tow cable 124. The transmitter/receiver 112 includes an electrical output optical detector 128. The electrical output signals from the detector 128 may be measured to determine the frequency, content and amplitude of acoustic waves as well as their angle of incidence with the sensor 118.

The methodology of remote activation and analysis of an elongated fiber optic sensor as illustrated in FIG. 5, is as follows: The pulsed laser source 116 included in the optical transmitter/receiver 112 periodically activates the elongated fiber optic sensor 118 within the fiber optic sensor housing 120 via the fiber optic input line 122 within the tow cable 124. The output of the sensor 118 is detected by feeding it into the electrical output optical detector 116 included in the transmitter/receiver 112 via the fiber optic output line 126 within the two cable 124. The electrical output from the detector 116 is measured to determine the frequency, content, and amplitude of acoustic waves as well as their angle of incidence with the sensor 118.

It will be understood that various changes in the details, materials and arrangements of parts which have been herein described and illustrated in order to explain the nature of the invention may be made by those skilled in the art within the principle and scope of the invention as expressed in the appended claims.

What is claimed and desired to be secured by Letters Patent of the United States is:

1. In a telemetry system for a remote fiber optic sensor array, a method for remote activation of fiber optic sensors and analysis of their outputs with optical wavelength multiplexing comprising:

grouping a plurality of fiber optic sensors into equal numbered groups;

activating one said sensor in each of said sensor groups with a different one of a plurality of different wavelengths of laser light radiation equal in number to said sensor groups to form optic output signals at different optic wavelengths;

combining together said output signals of all said sensors in each said sensor group to form a plurality of multiplexed sensor output signals equal in number to said groups of sensors;

dividing each of said multiplexed output signals by wavelength filtering at each of said different wavelengths of said radiation to reproduce said individual optic sensor outputs multiplexed therein; and converting each said reproduced optic sensor output to form an electrical sensor output signal corresponding to each of said sensor outputs.

2. The method as recited in claim 1, wherein said step of activating said sensors further includes activating said sensors by transmitting said laser light radiation to said sensors through a different one of a plurality of fiber optic input cables for each said different wavelength of radiation.

3. The method as recited in claim 2, wherein said step of activating said sensors further includes activating said sensors by coupling each said fiber optic input cable to one different said sensor in each said sensor group.

4. The method as recited in claim 3, wherein said step of combining together said output signals includes combining said output signals by coupling said output signals from all said sensors in each said sensor group to a different one of a plurality of common fiber optic output cables.

5. In a telemetry system for a remote fiber optic sensor array, a method for remote activation ot fiber optic sensors and analysis of their outputs with modulated signal frequency multiplexing comprising:

grouping a plurality of fiber optic sensors into equal numbered groups;

modulating each one of a plurality of laser light radiation sources equal in number to said sensor groups with a different frequency modulation signal;

activating one said sensor in each of said sensor groups with a different one of said plurality of radiation sources to form sensor output signals having said modulation signal dependent frequencies;

combining together said output signals of all said sensors in each said sensor group to form a plurality of optic multiplexed sensor output signals equal in number to said groups of sensors;

converting each of said optic multiplexed output signals into corresponding electrical multiplexed output signals; and dividing each of said electrical multiplexed signal by electrical frequency filtering at every different said sensor output signal frequency therein to form individual electrical output signals corresponding to said individual sensor outputs multiplexed therein.

6. The method as recited in claim 5, wherein said step of modulating said laser radiation sources includes modulating said sources with modulation signals of periodic waveform.

7. The method as recited in claim 6, wherein said step of activating said sensors further includes activating said sensors by transmitting said laser light radiation to said sensors through a different one of a plurality of fiber optic input cables for each said laser source.

8. The method as recited in claim 7, wherein said step of activating said sensors further includes activating said sensors by coupling each said fiber optic input cable to one different said sensor in each said sensor group.

9. The method as recited in claim 8, wherein said step of combining together said output signals includes combining said output signals by coupling said output signals from all said sensors in each said sensor group to a different one of a plurality of common fiber optic output cables.

10. In a telemetry system for a remote fiber optic array, a method for remote activation of fiber optic sensors and analysis of their outputs with optical wavelength and modulated signal frequency multiplexing comprising:

grouping a plurality of fiber optic sensors into equal numbered groups;

modulating each one of a plurality of different wavelengths of laser light radiation equal in number to said sensor groups with a different modulation signal frequency;

activating one said sensor in each of said sensor groups with a different one of said plurality of different wavelengths of radiation to form optic sensor output signals having said modulation signal dependent frequencies at different optic wavelengths;

combining together said sensor outputs of all said sensors in each said sensor group to form a plurality of optic multiplexed sensor output signals equal in number to said groups of sensors;

dividing each of said multiplexed output signals by wavelength filtering at each of said different wavelengths of said radiation to reproduce said individual optic sensor outputs multiplexed therein;

converting each said reproduced optic sensor output into a corresponding electrical sensor output signal; and filtering each said electrical sensor output signal at said corresponding output signal frequency to form a filtered electrical sensor output signal for each sensor.

11. The method as recited in claim 10, wherein said step of activating said sensors further includes activating said sensors by transmitting said laser light radiation to said sensors through a different one of a plurality of fiber optic input cables for each said laser source.

12. The method as recited in claim 11, wherein said step of activating said sensors further includes activating said sensors by coupling each said fiber optic input cable to one different said sensor in each said sensor group.

13. The method as recited in claim 12, wherein said step of combining together said output signals includes combining said output signals by coupling said output signals from all said sensors in each said sensor group to a different one of a plurality of common fiber optic output cables.

14. In a telemetry system for a remote fiber optic sensor array, an apparatus for remote activation of fiber optic sensors and analysis of their outputs with optical wavelength multiplexing comprising:
- a plurality of equal numbered groups of fiber optic sensors;
- lasing means for generating a plurality of different wavelengths of laser light radiation equal in number to said sensor groups;
- combinational input transmission means for directing each different said wavelength of radiation to one said sensor in each said sensor group to form optic outputs of different optic wavelengths;
- combinational output transmission means for combining and transmitting said sensor outputs from all said sensors in each said sensor group to form a plurality of composite multiplexed output signals equal in number to said sensor groups;
- wavelength separation means for separating each of said composite multiplexed output signals by wavelength filtering at each of said wavelengths of said radiation to reproduce each of said individual optic sensor outputs multiplexed therein; and
- electrical conversion means for converting each of said reproduced individual sensor outputs to form a plurality of individual electrical sensor output signals each corresponding to a different one of said sensor outputs.

15. The apparatus as recited in claim 14, wherein said lasing means comprises a plurality of laser light sources, each of different wavelength.

16. The apparatus as recited in claim 15, wherein said combinational input transmission means comprises a plurality of fiber optic input cables, one different said input cable connecting each said laser source to one different said sensor in each said sensor group.

17. The apparatus as recited in claim 16, wherein said combinational output transmission means further comprises a plurality of fiber optic output cables, one said different output cable connecting all said sensors in each said sensor group.

18. The apparatus as recited in claim 17, wherein said wavelength separation means comprises a plurality of wavelength separation filters.

19. The apparatus as recited in claim 18, wherein said wavelength separation means further comprises said wavelength separation filters tuned to each of said laser source wavelengths.

20. In a telemetry system for a towed fiber optic sensor array, an apparatus for remote activation of fiber optic sensors and analysis of their outputs with modulation signal frequency comprising:
- a plurality of equal numbered groups of fiber optic sensors;
- lasing means for generating a plurality of laser light radiation sources equal in number to said sensor groups;
- modulation means for modulating each said radiation source with a different frequency modulation signal;
- combinational input transmission means for directing each different said radiation source to one said sensor in each said sensor group to form output signals having said modulation signal dependent frequencies;
- combinational output transmission means for combining and transmitting said sensor outputs from all said sensors in each said sensor group to form a plurality of composite multiplexed output signals equal in number to said sensor groups;
- electrical conversion means for converting each said composite multiplexed signal to form a corresponding electrical multiplexed output signal; and
- filtering means for filtering each of said electrical multiplexed output signals at each of said different output signal frequencies to form a plurality of individual electrical sensor output signals each corresponding to a different one of said sensor outputs.

21. The apparatus as recited in claim 20, wherein said modulation means comprises a plurality of laser source modulators, one for each said laser source and each having a different periodic modulation signal.

22. The apparatus as recited in claim 21, wherein said combinational input transmission means comprises a plurality of fiber optic input cables, one said different input cable connecting each said laser source to one different said sensor in each said sensor group.

23. The apparatus as recited in claim 22, wherein said combinational output transmission means further comprises a plurality of fiber optic output cables, one said different output cable connecting all said sensors in each said sensor group.

24. The apparatus as recited in claim 23, wherein said electrical conversion means comprises a plurality of electrical output optical detectors.

25. The method as recited in claim 24, wherein said filtering means comprises a plurality of frequency selective filters.

26. In a telemetry system for a towed fiber optic sensor array, an apparatus for remote activation of fiber optic sensors and analysis of their outputs with optical wavelength and modulation signal frequency multiplexing comprising:
- a plurality of equal numbered groups of fiber optic sensors;
- lasing means for generating a plurality of different wavelengths of laser light radiation equal in number to said sensor groups;
- modulation means for modulating each one of said plurality of different wavelengths of radiation with a different frequency modulation signal;
- combinational input transmission means for directing each different said wavelength of radiation to one said sensor in each said sensor group to form output signals having said modulation signal dependent frequencies at different optical wavelengths;
- combinational output transmission means for combining and transmitting said sensor outputs from all said sensors in each said sensor group to form a plurality of composite multiplexed output signals equal in number to said sensor groups;
- wavelength separation means for separating each of said composite multiplexed output signals by wavelength filtering at each of said different wavelengths of said radiation to reproduce each of said individual sensor outputs multiplexed therein;
- electrical conversion means for converting each said reproduced individual sensor output to form a plurality of electrical sensor output signals each corresponding to a different one of said sensor outputs; and
- filtering means for filtering each said electrical sensor output signal for each said sensor at said corresponding output signal frequency to form a plurlaity of individual filtered electrical output signals each corresponding to a different one of said sensor outputs.

27. The apparatus as recited in claim 26, wherein said lasing means comprises a plurality of laser light sources, each of different wavelength.

28. The apparatus as recited in claim 27, wherein said combinational input transmission means comprises a plurality of fiber optic input cables, one said different input cable connecting each said laser source to one different said sensor in each said sensor group.

29. The apparatus as recited in claim 28, wherein said combinational output transmission means further comprises a plurality of fiber optic output cables, one said different output cable connecting all said sensors in each said sensor group.

30. The apparatus as recited in claim 29, wherein said wavelength separation means comprises a plurality of wavelength separation filters.

31. The apparatus as recited in claim 30, wherein said wavelength separation means further comprises said wavelength separation filters tuned to each of said laser source wavelengths.

32. The apparatus as recited in claim 31, wherein said electrical conversion means comprises a plurality of electrical output optical detectors.

33. The method as recited in claim 32, wherein said filtering means comprises a plurality of frequency selective filters.

* * * * *